(12) United States Patent
Chakraborty et al.

(10) Patent No.: US 9,701,877 B2
(45) Date of Patent: Jul. 11, 2017

(54) COMPOSITIONS OF DIAMOND PARTICLES HAVING ORGANIC COMPOUNDS ATTACHED THERETO

(71) Applicant: Baker Hughes Incorporated, Houston, TX (US)

(72) Inventors: Soma Chakraborty, Houston, TX (US); Gaurav Agrawal, Aurora, CO (US); Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 64 days.

(21) Appl. No.: 14/599,213

(22) Filed: Jan. 16, 2015

(65) Prior Publication Data

US 2015/0128504 A1     May 14, 2015

Related U.S. Application Data

(60) Division of application No. 13/275,872, filed on Oct. 18, 2011, now Pat. No. 8,936,659, which is a (Continued)

(51) Int. Cl.
  *B24D 3/00*     (2006.01)
  *B24D 3/02*     (2006.01)
  (Continued)

(52) U.S. Cl.
  CPC .............. *C09K 3/1436* (2013.01); *B01J 3/062* (2013.01); *B24D 99/005* (2013.01); *B82Y 30/00* (2013.01);
  (Continued)

(58) Field of Classification Search
  USPC .................................................. 51/298, 293
  See application file for complete search history.

(56) References Cited

U.S. PATENT DOCUMENTS 3,663,475 A   5/1972   Figiel
3,745,623 A   7/1973   Wentorf, Jr. et al.
(Continued)

FOREIGN PATENT DOCUMENTS

EP   0604211 A1   6/1994
EP    659510 B1   6/1995
(Continued)

OTHER PUBLICATIONS

Cleveland et al., Raman Spectrum of 1 Bromo Dodecane, J. Chem. Phys, 1940, vol. 8, p. 867.
(Continued)

*Primary Examiner* — James McDonough
(74) *Attorney, Agent, or Firm* — TraskBritt

(57) ABSTRACT

A substance includes diamond particles having a maximum linear dimension of less than about 1 µm and an organic compound attached to surfaces of the diamond particles. The organic compound may include a surfactant or a polymer. A method of forming a substance includes exposing diamond particles to an organic compound, and exposing the diamond particles in the presence of the organic compound to ultrasonic energy. The diamond particles may have a maximum linear dimension of less than about 1 µm. A composition includes a liquid, a plurality of diamond nanoparticles dispersed within the liquid, and an organic compound attached to surfaces of the diamond nanoparticles. A method includes mixing a plurality of diamond particles with a solution comprising a liquid solvent and an organic compound, and exposing the mixture including the plurality of diamond nanoparticles and the solution to ultrasonic energy.

17 Claims, 6 Drawing Sheets

Related U.S. Application Data continuation-in-part of application No. 13/077,426, filed on Mar. 31, 2011.

(60) Provisional application No. 61/324,142, filed on Apr. 14, 2010.

(51) Int. Cl.

| | | |
|---|---|---|
| B24D 11/00 | (2006.01) | |
| B24D 18/00 | (2006.01) | |
| C09K 3/14 | (2006.01) | |
| B01J 3/06 | (2006.01) | |
| B24D 99/00 | (2010.01) | |
| B82Y 30/00 | (2011.01) | |
| C01B 31/06 | (2006.01) | |

(52) U.S. Cl.
CPC ....... *C01B 31/065* (2013.01); *B01J 2203/062* (2013.01); *B01J 2203/0655* (2013.01); *B01J 2203/0685* (2013.01); *Y10T 428/2982* (2015.01)

(56) References Cited

U.S. PATENT DOCUMENTS

| | | | |
|---|---|---|---|
| 4,148,368 | A | 4/1979 | Evans |
| 4,224,380 | A | 9/1980 | Bovenkerk et al. |
| 4,311,490 | A | 1/1982 | Bovenkerk et al. |
| 4,412,980 | A | 11/1983 | Tsuji et al. |
| 4,525,179 | A | 6/1985 | Gigl |
| 4,592,433 | A | 6/1986 | Dennis |
| 4,604,106 | A | 8/1986 | Hall et al. |
| 4,605,343 | A | 8/1986 | Hibbs, Jr. et al. |
| 4,636,253 | A | 1/1987 | Nakai et al. |
| 4,664,705 | A | 5/1987 | Horton et al. |
| 4,694,918 | A | 9/1987 | Hall et al. |
| 4,726,718 | A | 2/1988 | Meskin et al. |
| 4,784,023 | A | 11/1988 | Dennis |
| 4,797,241 | A | 1/1989 | Peterson et al. |
| 4,861,350 | A | 8/1989 | Phaal et al. |
| 4,866,885 | A | 9/1989 | Dodsworth |
| 4,903,164 | A | 2/1990 | Bishop et al. |
| 4,940,180 | A | 7/1990 | Martell |
| 4,944,772 | A | 7/1990 | Cho |
| 4,976,324 | A | 12/1990 | Tibbitts |
| 5,011,514 | A | 4/1991 | Cho et al. |
| 5,027,912 | A | 7/1991 | Juergens |
| 5,127,923 | A | 7/1992 | Bunting et al. |
| 5,217,081 | A | 6/1993 | Waldenstrom et al. |
| 5,443,337 | A | 8/1995 | Katayama |
| 5,472,376 | A | 12/1995 | Olmstead et al. |
| 5,533,582 | A | 7/1996 | Tibbitts |
| 5,645,617 | A | 7/1997 | Frushour |
| 5,662,183 | A | 9/1997 | Fang |
| 5,667,028 | A | 9/1997 | Truax et al. |
| 5,685,769 | A | 11/1997 | Adia et al. |
| 5,722,499 | A | 3/1998 | Nguyen et al. |
| 5,979,577 | A | 11/1999 | Fielder |
| 5,979,578 | A | 11/1999 | Packer |
| 6,009,963 | A | 1/2000 | Chaves et al. |
| 6,045,440 | A | 4/2000 | Johnson et al. |
| 6,148,937 | A | 11/2000 | Mensa et al. |
| 6,149,695 | A | 11/2000 | Adia et al. |
| 6,187,068 | B1 | 2/2001 | Frushour et al. |
| 6,220,375 | B1 | 4/2001 | Butcher et al. |
| 6,302,405 | B1 | 10/2001 | Edwards |
| 6,325,165 | B1 | 12/2001 | Eyre |
| 6,344,149 | B1 | 2/2002 | Oles |
| 6,361,873 | B1 | 3/2002 | Yong et al. |
| 6,377,387 | B1 | 4/2002 | Duthaler et al. |
| 6,533,644 | B1 | 3/2003 | Horie et al. |
| 6,544,599 | B1 | 4/2003 | Brown et al. |
| 6,655,234 | B2 | 12/2003 | Scott |
| 6,655,845 | B1 | 12/2003 | Pope et al. |
| 6,719,074 | B2 | 4/2004 | Tsuda et al. |
| 6,951,578 | B1 | 10/2005 | Belnap et al. |
| 6,991,049 | B2 | 1/2006 | Eyre et al. |
| 7,070,635 | B2 | 7/2006 | Frushour |
| 7,074,247 | B2 | 7/2006 | Tank et al. |
| 7,147,687 | B2 | 12/2006 | Mirkin et al. |
| 7,224,039 | B1 * | 5/2007 | McGuire ............... B82Y 30/00 205/109 |
| 7,235,296 | B2 | 6/2007 | Hunt et al. |
| 7,348,298 | B2 | 3/2008 | Zhang et al. |
| 7,419,941 | B2 | 9/2008 | Waynick |
| 7,435,296 | B1 | 10/2008 | Sung |
| 7,449,432 | B2 | 11/2008 | Lockwood et al. |
| 7,493,973 | B2 | 2/2009 | Keshavan et al. |
| 7,516,804 | B2 | 4/2009 | Vail |
| 7,572,332 | B2 | 8/2009 | Gruen |
| 7,585,342 | B2 | 9/2009 | Cho |
| 7,628,234 | B2 | 12/2009 | Middlemiss |
| 7,635,035 | B1 | 12/2009 | Bertagnolli et al. |
| 7,647,992 | B2 | 1/2010 | Fang et al. |
| 7,690,589 | B2 | 4/2010 | Kerns |
| 8,118,896 | B2 | 2/2012 | Can et al. |
| 2003/0175498 | A1 | 9/2003 | Hunt |
| 2004/0022861 | A1 | 2/2004 | Williams, III et al. |
| 2004/0037948 | A1 | 2/2004 | Tank et al. |
| 2004/0118762 | A1 | 6/2004 | Xu et al. |
| 2004/0121070 | A1 | 6/2004 | Xu |
| 2005/0019114 | A1 | 1/2005 | Sung |
| 2005/0136667 | A1 | 6/2005 | Sung |
| 2005/0139397 | A1 | 6/2005 | Achilles et al. |
| 2005/0158549 | A1 | 7/2005 | Khabashesku et al. |
| 2005/0161212 | A1 | 7/2005 | Leismer |
| 2006/0113546 | A1 | 6/2006 | Sung |
| 2006/0166615 | A1 | 7/2006 | Tank et al. |
| 2007/0036896 | A1 | 2/2007 | Sung |
| 2007/0254560 | A1 | 11/2007 | Woo et al. |
| 2008/0023230 | A1 | 1/2008 | Cho |
| 2008/0127475 | A1 | 6/2008 | Griffo |
| 2008/0142267 | A1 | 6/2008 | Griffin et al. |
| 2008/0179109 | A1 | 7/2008 | Belnap et al. |
| 2008/0206576 | A1 | 8/2008 | Qian et al. |
| 2008/0209818 | A1 | 9/2008 | Belnap et al. |
| 2009/0022952 | A1 | 1/2009 | Keshavan |
| 2009/0022969 | A1 | 1/2009 | Zhang et al. |
| 2009/0042166 | A1 | 2/2009 | Craig et al. |
| 2009/0090918 | A1 | 4/2009 | Hobart et al. |
| 2009/0127565 | A1 | 5/2009 | Sung |
| 2009/0158670 | A1 | 6/2009 | Vail |
| 2009/0178345 | A1 | 7/2009 | Russell et al. |
| 2009/0218146 | A1 | 9/2009 | Fang et al. |
| 2009/0218276 | A1 | 9/2009 | Linford et al. |
| 2009/0218287 | A1 | 9/2009 | Vail et al. |
| 2009/0221773 | A1 | 9/2009 | Linford et al. |
| 2009/0257942 | A1 | 10/2009 | Sung |
| 2009/0277839 | A1 | 11/2009 | Linford |
| 2009/0286352 | A1 | 11/2009 | Sung |
| 2009/0313908 | A1 | 12/2009 | Zhang et al. |
| 2010/0012389 | A1 | 1/2010 | Zhang et al. |
| 2010/0041315 | A1 | 2/2010 | Sung |
| 2010/0068503 | A1 | 3/2010 | Neogi et al. |
| 2010/0069567 | A1 | 3/2010 | Petrov et al. |
| 2010/0129615 | A1 | 5/2010 | Chizik et al. |
| 2010/0187925 | A1 | 7/2010 | Tingler et al. |
| 2011/0059876 | A1 | 3/2011 | Takahama et al. |
| 2011/0088954 | A1 | 4/2011 | DiGiovanni et al. |
| 2011/0252711 | A1 | 10/2011 | Chakraborty et al. |
| 2011/0252712 | A1 | 10/2011 | Chakraborty et al. |
| 2011/0252713 | A1 | 10/2011 | Chakraborty et al. |
| 2012/0003479 | A1 | 1/2012 | Hsin et al. |
| 2012/0034464 | A1 | 2/2012 | Chakraborty et al. |
| 2012/0037431 | A1 | 2/2012 | DiGiovanni et al. |

FOREIGN PATENT DOCUMENTS

| | | |
|---|---|---|
| EP | 941791 A2 | 3/1998 |
| EP | 941791 A3 | 9/1999 |
| EP | 1330323 B1 | 5/2006 |
| EP | 2105256 A1 | 9/2009 |
| EP | 2147903 A2 | 1/2010 |
| EP | 2147903 A3 | 2/2011 |

(56) References Cited

FOREIGN PATENT DOCUMENTS

| | | | |
|---|---|---|---|
| JP | 2008115303 | A | 5/2008 |
| WO | 0038864 | A1 | 7/2000 |
| WO | 0234437 | A2 | 5/2002 |
| WO | 2006032984 | A2 | 3/2006 |
| WO | 2008014003 | A2 | 1/2008 |
| WO | 2008092093 | A2 | 7/2008 |
| WO | 2008094190 | A2 | 8/2008 |
| WO | 2008092093 | A3 | 9/2008 |
| WO | 2008130431 | A2 | 10/2008 |
| WO | 2008094190 | A3 | 12/2008 |
| WO | 2008014003 | A3 | 1/2009 |
| WO | 2009048268 | A2 | 4/2009 |
| WO | 2009118381 | A2 | 10/2009 |
| WO | 2009118381 | A3 | 1/2010 |
| WO | 2010062419 | A2 | 6/2010 |
| WO | 2010062419 | A3 | 7/2010 |
| WO | 2011046838 | A1 | 4/2011 |

OTHER PUBLICATIONS

European Search Report for European Application No. 11769288 dated Nov. 18, 2013, 8 pages.

International Search Report for International Application No. PCT/US2011/032502 dated Dec. 27, 2011, 4 pages.

International Search Report for International Application No. PCT/US2011/030924 dated Dec. 27, 2012, 3 pages.

International Written Opinion for International Application No. PCT/US2011/032502 dated Dec. 27, 2011, 4 pages.

International Written Opinion for International Application No. PCT/US2011/030924 dated Dec. 27, 2012, 4 pages.

International Preliminary Report on Patentability for International Application No. PCT/US2011/032502, dated Oct. 16, 2012, 5 pages.

International Preliminary Report on Patentability for International Application No. PCT/US2011/030924, dated Oct. 16, 2012, 5 pages.

Liu et al., "Functionalization of Carbon Nano-Onions by Direct Fluorinations" Chem. Mater. vol. 19, No. 4 (2007) pp. 778-786.

Moore et al., Individually Suspended Single-Walled Carbon Nanotubes in Various Surfactants, American Chemical Society, Nano Letters, vol. 3, No. 10, 2003, pp. 1379-1382.

Saini et al., Core-shell diamond as a support for solid-phase extraction and high-performance liquid chromatography, Anal Chem. Jun. 1, 2010;82(11):4448-4456.

\* cited by examiner

COMPOSITIONS OF DIAMOND PARTICLES HAVING ORGANIC COMPOUNDS ATTACHED THERETO

CROSS-REFERENCE TO RELATED APPLICATIONS

This application is a divisional of U.S. patent application Ser. No. 13/275,872, filed Oct. 18, 2011, now U.S. Pat. No. 8,936,659, issued Jan. 20, 2015, which is a continuation-in-part application of U.S. patent application Ser. No. 13/077,426, filed Mar. 31, 2011, and titled "Method of Preparing Polycrystalline Diamond from Derivatized Nanodiamond," which claims the benefit of U.S. Provisional Patent Application No. 61/324,142, filed Apr. 14, 2010. The subject matter of this application is related to the subject matter of U.S. patent application Ser. No. 13/084,003, filed Apr. 11, 2011, and titled "Diamond Particle Mixture," now U.S. Pat. No. 8,974,562, issued Mar. 10, 2015; and to the subject matter of U.S. patent application Ser. No. 13/084,067, filed Apr. 11, 2011, titled "Method of Making a Diamond Particle Suspension and Method of Making a Polycrystalline Diamond Article Therefrom," now U.S. Pat. No. 9,079,295, issued Jul. 14, 2015. The entire disclosures of each of these applications are hereby incorporated herein by reference in their entirety.

FIELD

Embodiments of the present disclosure generally relate to coating diamond particles with one or more of various substances to facilitate subsequent use or further processing of the coated diamond particles.

BACKGROUND

Earth-boring tools for forming boreholes in subterranean earth formations such as for hydrocarbon production, carbon dioxide sequestration, etc., generally include a plurality of cutting elements secured to a body. For example, fixed-cutter earth-boring rotary drill bits (also referred to as "drag bits") include cutting elements fixed to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

Drill bits having superabrasive drilling surfaces may provide improved performance in such down-hole environments. In particular, polycrystalline diamond compacts (PDCs) formed of small (e.g., micron-sized) diamond grains fused and bonded together in a high temperature, high pressure process (known in the art as an HTHP process) using a metal catalyst, and supported on a substrate (e.g., a cobalt-cemented tungsten carbide substrate), can be incorporated onto a drill bit. Such drill bits have been found to provide a superabrasive surface capable of cutting through hard rock for extended periods of time, and under severe down-hole conditions of temperature, pressure, and corrosive environments, while maintaining the integrity and performance of the drill bit.

PDC cutting elements in which the catalyst material remains in the diamond table are generally thermally stable up to a temperature of about 750° C., although internal stress within the cutting element may begin to develop at temperatures exceeding about 400° C. due to phase changes in the metal catalyst (e.g., cobalt, which undergoes a transition from the beta phase to the alpha phase) and/or differences in the thermal expansion of the diamond grains and the catalyst metal at the grain boundaries. Hence, over time, PDC drill bits are subject to cumulative failure modes. In the course of drilling, cutting elements can wear, fracture, or accumulate damage that can alter, limit, or significantly degrade their performance in the application to which they were applied. Degradation of cutter performance can cause delays in the drilling process, increasing the overall cost of producing a well.

BRIEF SUMMARY

In some embodiments, a substance may include diamond particles having a maximum linear dimension of less than about 1 μm and an organic compound attached to surfaces of the diamond particles. The organic compound may include at least one of a surfactant and a polymer.

A method of forming a substance may include exposing diamond particles to an organic compound, and exposing the diamond particles in the presence of the organic compound to ultrasonic energy. The diamond particles may have a maximum linear dimension of less than about 1 μm.

In other embodiments, a composition may include a liquid, a plurality of diamond nanoparticles dispersed within the liquid, and an organic compound attached to surfaces of the diamond nanoparticles.

In certain embodiments, a method includes mixing a plurality of diamond particles with a solution comprising a liquid solvent and an organic compound, and exposing the mixture including the plurality of diamond nanoparticles and the solution to ultrasonic energy.

BRIEF DESCRIPTION OF THE DRAWINGS

While the specification concludes with claims particularly pointing out and distinctly claiming what are regarded as embodiments of the disclosure, the advantages of this disclosure may be more readily ascertained from the description of example embodiments of the disclosure set forth below, when read in conjunction with the accompanying drawings, in which:

DETAILED DESCRIPTION

Figure 1:
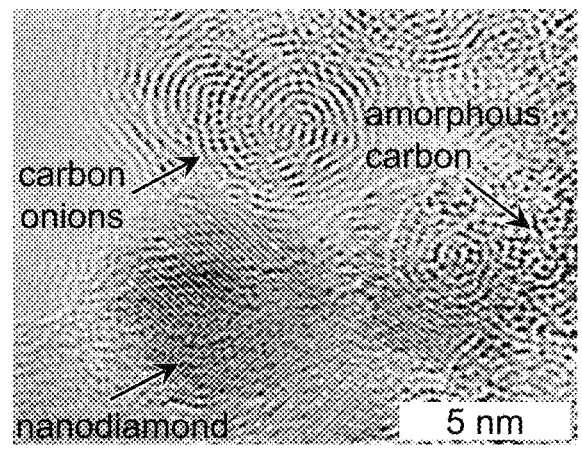
FIG. 1 is a transmission electron microscopy (TEM) image of a diamond nanoparticle showing a diamond core, carbon onions, and an amorphous carbon region.

Disclosed herein is a novel method of forming a polycrystalline diamond. As used herein, the term "polycrystalline" means a material (e.g., diamond or diamond composite) comprising a plurality of particles (i.e., crystals) that are bonded directly together by interparticle bonds. The crystal structures of the individual grains of the material may be randomly oriented in space within the polycrystalline material.

It has been found that derivatizing diamond nanoparticles to include functional groups and suspending in a solvent and/or water the derivatized diamond nanoparticles with other components of the polycrystalline diamond such as a larger diamond particle (e.g., diamond microparticles) and a metal for catalyzing carbon-carbon bonding during diamond formation, affords a precursor suspension when combined with a solvent in which the components are uniformly distributed. The derivatized diamond nanoparticles have a greater affinity to their environment while suspended and remain suspended longer than non-derivatized diamond nanoparticles, or particles that have been co-suspended with a dispersant.

From this suspension, a precursor compact can be prepared, and after subsequent thermal (at least 1,000° C.) and pressure (at least 5 gigapascals (GPa)) treatment followed by catalyst removal, the resulting polycrystalline diamond has a highly uniform structure that has increased resistance to wear and degradation resulting from use in, e.g., a drilling application. Such a polycrystalline diamond, and a PDC and cutting tool (e.g., a drill bit) prepared from the polycrystalline diamond, has a longer effective useful life than a similarly prepared polycrystalline diamond prepared without derivatized diamond nanoparticles.

The polycrystalline diamond, prepared by the method herein, includes diamond nanoparticles that have been derivatized, diamond microparticles, and a metal solvent-catalyst. Additional components, such as nanoparticles not identical to the derivatized diamond nanoparticles, and microparticles not identical to the diamond microparticles, may be included.

Diamond nanoparticles are diamond particles having an average particle size of less than one micrometer (μm). As used herein, "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Diamond nanoparticles, as disclosed herein, generally include diamond particles having an average particle size of 1 nanometer (nm) to less than 1 μm, and include both diamond particles having an average particle size of 250 nm or less (sometimes referred to in the art as "nanodiamonds"), and diamond particles having an average particle size of greater than 250 nm to less than 1 μm (sometimes referred to in the art as "sub-micron sized" diamond particles). In an embodiment, a diamond nanoparticle may have an average particle size of about 0.01 to about 500 nanometers (nm), specifically 0.1 to 250 nm, more specifically about 1 to about 150 nm, more specifically about 10 to about 125 nm, and still more specifically about 25 to about 100 nm. The diamond nanoparticles may be monodisperse, where all particles are of the same size with little variation, or polydisperse, where the particles have a range of sizes. Generally, polydisperse diamond nanoparticles are used. Diamond nanoparticles of different average particle size may be used, and in this way, the particle size distribution of the diamond nanoparticles may be unimodal (exhibiting a single distribution), bimodal exhibiting two distributions, or multi-modal, exhibiting more than one particle size distribution, where there is a gradient in particle size.

The minimum particle size for the smallest 5 percent of the diamond nanoparticles may be less than 0.1 nm, specifically less than or equal to 0.05 nm, and more specifically less than or equal to 0.01 nm. Similarly, the maximum particle size for 95% of the diamond nanoparticles is greater than or equal to 900 nm, specifically greater than or equal to 750 nm, and more specifically greater than or equal to 500 nm.

The diamond nanoparticles used herein may be from a naturally occurring source, such as a by-product of milling or other processing of natural diamonds, or may be synthetic, prepared by any suitable commercial method such as, but not limited to, HTHP processes, explosive shock (also referred to as detonation, abbreviated DTD), chemical vapor deposition (CVD), physical vapor deposition (PVD), ultrasonic cavitation, and the like. Diamond nanoparticles may be used as received, or may be sorted and cleaned by various methods to remove contaminants and non-diamond carbon phases that may be present, such as residues of amorphous carbon or graphite.

Some diamond nanoparticles used herein are derivatized to introduce functional groups to the diamond nanoparticles. The derivatized diamond nanoparticles include functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing. Alternatively, or in addition, the diamond microparticles may be derivatized with the foregoing functional groups.

In an embodiment, diamond nanoparticles can be derivatized by oxidative methods to produce carboxylic acid functional groups, which carry a negative charge. In another embodiment, the diamond nanoparticles can be further derivatized by grafting certain polymer chains, which may be neutral in charge, or which can carry either a negative or a positive charge by adjusting the pH value of its aqueous solution. For example, polymer chains such as acrylic chains having carboxylic acid functional groups, hydroxy functional groups, and/or amine functional groups; polyamines such as polyethyleneamine or polyethyleneimine; and poly (alkylene glycols) such as poly(ethylene glycol) and poly (propylene glycol), may be included by derivatization of the diamond nanoparticles.

It will be appreciated that the diamond nanoparticles being functionalized include, in addition to a diamond lattice core, a shell or surrounding region of a graphitic compositions including amorphous carbon and an ordered graphitic region sometimes referred to as a "carbon onion." FIG. 1 is a transmission electron microscopy (TEM) image of an exemplary diamond nanoparticle showing a diamond core, carbon onions, and amorphous carbon region. The carbon onion may surround the diamond lattice core and may be attached to the core by covalent bonds or by a dispersion mechanism. The amorphous carbon region and especially the carbon onion region of diamond nanoparticles are believed to include sites of unsaturation (e.g., double bonds) that react under conditions of functionalization to form functional groups.

Introduction of functional groups by derivatizing the unsaturated functionality associated with the amorphous and carbon onion regions of a diamond nanoparticle may be effected by any of numerous known methods for direct carbon-carbon bond formation to a double bond, or by linking to a functional group derived from an olefin. Exemplary methods of functionalizing may include, but are not limited to, reactions such as oxidation or oxidative cleavage of double bonds to form alcohols, diols, or carbonyl groups including aldehydes, ketones, or carboxylic acids; diazotization of double bonds proceeding by the Sandmeyer reaction; intercalation/metallization of the diamond nanoparticle by treatment with a reactive metal such as an alkali metal including lithium, sodium, potassium, and the like, to form an anionic intermediate, followed by treatment with a molecule capable of reacting with the metalized diamond nanoparticle such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of transmetalated species with boron, zinc, or tin groups, which react with, e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, or the like.

In other embodiments, the diamond nanoparticle may be treated to remove the outermost carbon onion prior to derivatizing. Where a treated diamond nanoparticle is derivatized, initial derivatization to include a functional group may be accomplished by, for example, direct halogenations using a method of halogenation such as free-radical halogenation to include, e.g., bromine atoms, followed by hydrolysis to the alcohol, or direct metallization, and further functionalized by, for example, ether synthesis or alkylation; introduction of oxygen functional groups such as alcohols or ketones by, for example, nitration followed by hydrolysis; or the like.

It will be appreciated that the above methods are intended to illustrate the concept of introducing functional groups to a diamond nanoparticle, and should not be considered as limiting to such methods.

Though methods of derivatizing particles to include functional groups bonded to particles has been described herein, a particle may, in some embodiments, have a material disposed over and attracted to a surface thereof by intermolecular forces. Such forces (e.g., hydrogen bonding) may generally be weaker than intramolecular forces.

Figure 2:
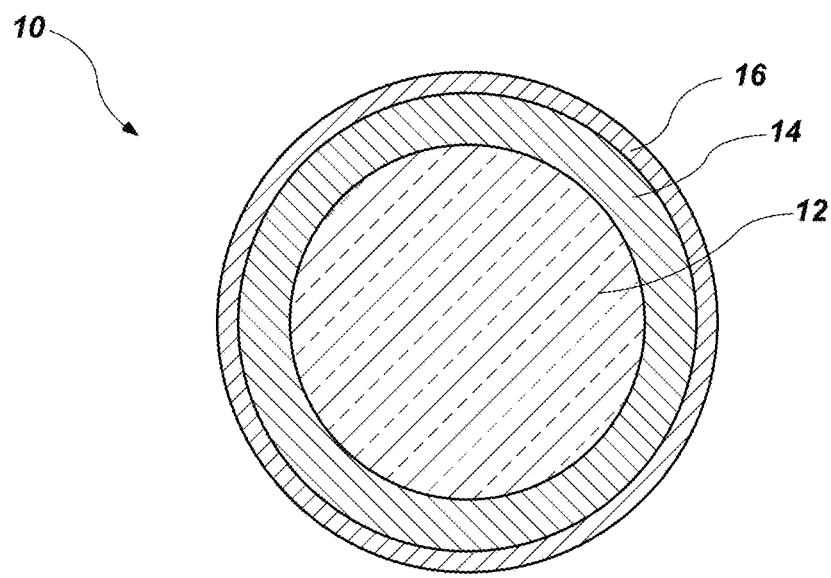
FIG. 2 is a simplified and schematically illustrated view of a coated diamond particle.

In some embodiments, diamond particles may be coated with an organic compound, such as a surfactant or a polymer. As shown in FIG. 2, a particle 10 may have a diamond core 12 at least partially surrounded by a carbon shell 14 or carbon onion. An organic compound 16 may substantially cover an outer surface of the diamond core 12 and, if present, the carbon shell 14, such as in a layer (e.g., a self-assembled monolayer). The organic compound may be, for example, an anionic surfactant, a cationic surfactant, a non-ionic surfactant, or an amphoteric surfactant. For example, suitable organic compounds may include sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether (BRIJ® 78, available from Fisher Scientific, USA, of Pittsburgh, Pa.), polyethylene glycol 4400 octadecyl ether (BRIJ® 700, available from Sigma-Aldrich, of St. Louis, Mo.), sodium dodecyl sulfate, polyethylene glycol sorbitan monooleate (TWEEN® 80, available from Sigma-Aldrich), polyoxyethylenesorbitan trioleate (TWEEN® 85, available from Sigma-Aldrich), polyethylene glycol sorbitan monolaurate (TWEEN® 20, available from Sigma-Aldrich), 4-(1,1,3,3-tetramethylbutyl)phenyl-polyethylene glycol (TRITON® X-100, available from Sigma-Aldrich), polyethylene glycol tert-octylphenyl ether (TRITON® X-405, available from Sigma-Aldrich), poly(vinylpyrrolidone)-1300, block copolymers based on ethylene oxide and 1,2-butylene oxide (e.g., PEO-PBO-PEO), or block copolymers based on ethylene oxide and propylene oxide, such as those sold by BASF, of Florham Park, N.J., under the trade name PLURONIC® (e.g., PLURONIC® P 103, PLURONIC® P 104, PLURONIC® P 105, PLURONIC® F 108, PLURONIC® F 98, PLURONIC® F 68, PLURONIC® F 127, PLURONIC® F 87, PLURONIC® F 77, or PLURONIC® P 85).

Figure 3:
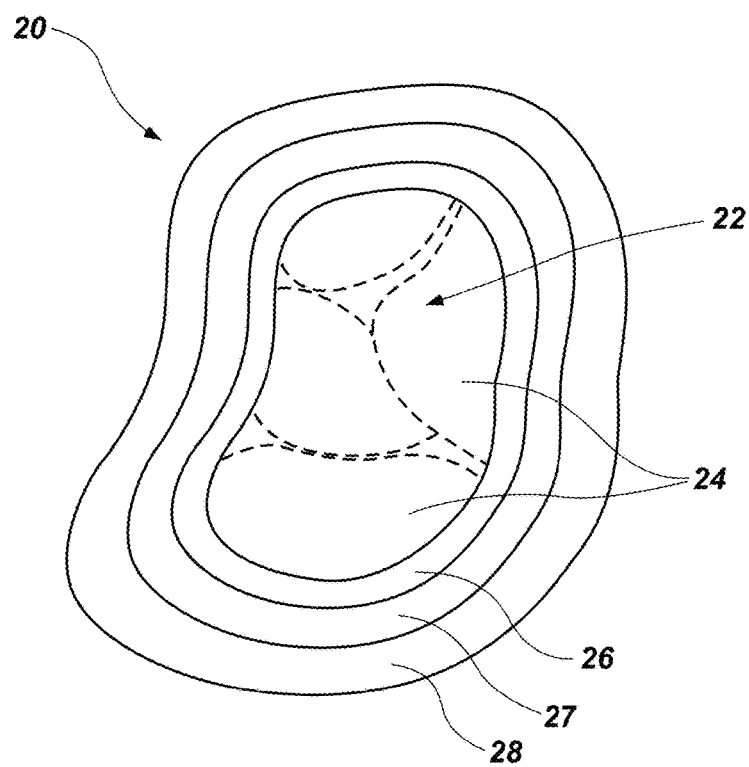
FIG. 3 is a simplified and schematically illustrated view of a coated agglomerate of diamond particles.

In some embodiments, as shown in FIG. 3, a particle 20 may include a core 22 or agglomerate having a plurality of diamond nanoparticles 24. To minimize surface energy, individual diamond nanoparticles 24 may structurally self-organize into clusters or primary aggregates. For example, diamond nanoparticles having a maximum linear dimension of about 4 nm to about 6 nm may form aggregates having a maximum linear dimension of about 20 nm to about 30 nm. Clusters or primary aggregates may form larger weakly bonded secondary aggregates having a maximum linear dimension ranging from hundreds of nanometers to one micrometer or more. The core 22 may include primary aggregates and/or secondary aggregates. In some embodiments, the core 22 may comprise an agglomerate having a maximum linear dimension (e.g., a diameter) of from about 10 nm to about 400 nm, such as from about 20 nm to about 200 nm.

With further reference to FIG. 3, a plurality of coatings 26, 27, 28 may be formed over the core 22. The coatings 26, 27, 28 may include one or more organic compounds, functional groups, surfactants, polymers, metals, etc. Though FIG. 3 shows three coatings 26, 27, 28, any number of coatings may be present over a core 22. Coatings 26, 27, 28 may be applied using layer-by-layer techniques or any other method known in the art for applying coatings. A coating 26, 27, 28 may include the same materials or different materials than other coatings 26, 27, 28. The particle 10 shown in FIG. 2 may also include multiple coatings (not shown).

To form the particles 10 or 20, shown in FIGS. 2 and 3 respectively, cores 12 or 22 comprising diamond (e.g., diamond nanoparticles) may be exposed to an organic compound (e.g., a surfactant or a polymer). For example, sodium laurel sulfate may be mixed with (e.g., dispersed in) an organic or inorganic solvent, such as water, an oil, an alcohol, a glycol, an acid, an aldehyde, a ketone, an amide, an amine, or any combination thereof. In particular, an organic compound may be dispersed in a solvent such as methylethylketone, methyletherketone tetrahydrofuran, dimethylformamide, sulfuric acid, water, etc. In some embodiments, the organic compound may be from about 0.1 wt % to about 40 wt % of the solvent, such as from about 1 wt % to about 20 wt %, or about 5 wt % to about 10 wt %. The solvent and organic compound may be applied to the cores 12 or 22.

The cores 12 or 22, the solvent, and/or the organic compound may be exposed to ultrasonic energy to stabilize, disperse, or otherwise process the organic compound and/or cores 12 or 22, and may form a stabilized fluid suspending the particles 10 or 20. For example, a mixture of the cores 12 or 22, the solvent, and/or the organic compound may be placed within a vessel. A transducer may be used to apply ultrasonic energy to the mixture. The ultrasonic energy may promote acoustic cavitation, including the formation, growth, and collapse of bubbles in the solvent. Acoustic cavitation may promote even dispersion of the cores 12 or 22 and/or the organic compound in the solution.

A stabilized fluid suspending the particles 10 or 20 may have a variety of uses. For example, a slurry may be dried, and the resulting particles 10 or 20 may be used to form a PDC cutting element, such as by an HTHP process. Coated nanoparticles 10 or 20 in a PDC may provide a higher density of a sintered product, due to a higher packing fraction attainable by including various particle sizes.

In some embodiments, coated particles 10 or 20 may be used to form engineered coatings. For example, an engineered coating over a polymeric surface may include coated particles 10 or 20, and may have a thickness of from about 100 nm to about 500 μm. Such an engineered coating may provide chemical resistance to liquids or gases. Cores 12 or 22 comprising diamond may be chemically inert, and thus, an engineered coating that includes coated particles 10 or 20 may provide a chemical barrier to diffusion of molecules. In other words, a path through the engineered coating may be tortuous, impeding the flow of contaminants. An engineered coating may optionally include conventional fillers, such as clay, mica, carbon black, silicates, etc.

As discussed previously, diamond crystals of the present disclosure may be arranged into polycrystalline diamond. The polycrystalline diamond further comprises diamond microparticles. Diamond microparticles are diamond particles having an average particle size of greater than or equal to 1 micrometer (μm). In an embodiment, the average particle size of the diamond microparticles is about 1 μm to about 250 μm, specifically about 2 μm to about 200 μm, and more specifically about 1 μm to about 150 μm.

As with the diamond nanoparticles above, the diamond microparticles may be monodisperse, where all particles are of the same size with little variation, or polydisperse, where the particles have a range of sizes. Generally, polydisperse diamond microparticles are used. Diamond microparticles of different average particle size, monodisperse or polydisperse or both, may be used, and the particle size distribution of the diamond microparticles may be unimodal bimodal, or multimodal. Diamond microparticles, as with the diamond nanoparticles, may be used as received, or may be sorted and cleaned by various methods to remove contaminants and non-diamond carbon phases that may be present, such as residues of amorphous carbon or graphite.

The minimum particle size for the smallest 5 percent of the diamond microparticles may be less than 0.1 μm, specifically less than or equal to 0.05 μm, and more specifically less than or equal to 0.01 μm. Similarly, the maximum particle size for 95% of the diamond microparticles is greater than or equal to 1,000 μm, specifically greater than or equal to 750 μm, and more specifically greater than or equal to 500 μm.

It will be understood that the average particle sizes of the derivatized diamond nanoparticles is less than that of the diamond microparticles. In an embodiment, the average particle size of the diamond microparticles is at least about 10 times greater, specifically about 25 times greater, more specifically about 50 times greater, and still more specifically about 100 times greater than the average particle size of the derivatized diamond nanoparticles. In another embodiment, the average particle size of the derivatized microparticles is about 150 times greater, and specifically about 250 to about 750 times greater than the average particle size of the derivatized diamond nanoparticles.

The polycrystalline diamond comprises 0.001 to 90 wt % of derivatized diamond nanoparticles based on the total weight of the derivatized diamond nanoparticles, diamond microparticles, and metal solvent-catalyst. In a specific embodiment, the polycrystalline diamond comprises 0.01 to 70 wt %, and more specifically 0.1 to 50 wt % of derivatized diamond nanoparticles based on the total weight of the derivatized diamond nanoparticles, diamond microparticles, and metal solvent-catalyst. In an exemplary embodiment, the derivatized diamond nanoparticles may be present in an amount of more specifically 0.1 to 10 wt %, based on the total weight of the derivatized diamond nanoparticles, diamond microparticles, and metal solvent-catalyst.

In an embodiment, the polycrystalline diamond may further include a nanoparticle not identical to the derivatized diamond nanoparticles, a microparticle not identical to the diamond microparticles, or a combination comprising at least one of the foregoing. In a further embodiment, the nanoparticle and/or microparticle may optionally be derivatized to have the aforementioned functional groups.

As used herein, the term "nanoparticle" means and includes any particle having an average particle size of about 1 μm or less. Nanoparticles may include, for example, fullerenes, nanographite, nanographene, graphene oxide, nanotubes, diamond nanoparticles including nano-sized and sub-micron sized diamond particles, diamondoids, polysilsesquioxanes, nanoclays, an inorganic nanoparticle including a metal or metalloid carbide, a metal or metalloid nitride, a metal carbonate, a metal bicarbonate, a metal oxide (ceramic), a metal nanoparticle, or combinations comprising at least one of the foregoing.

In an embodiment, nanoparticles used herein may have an average particle size of about 0.01 to about 500 nm, specifically 0.1 to 250 nm, and more specifically about 1 to about 150 nm. While it will be understood that the nanoparticles, including the diamond nanoparticles disclosed hereinabove, may be spherical, symmetrical, irregular, or elongated in shape and may have a low aspect ratio (i.e., largest dimension to smallest dimension) of less than 10 and approaching 1 in a spherical particle, in other embodiments the nanoparticle may have a two-dimensional aspect ratio (i.e., diameter to thickness for elongated nanoparticles such as nanotubes or diamondoids; or ratios of length to width, at an assumed thickness or surface area to cross-sectional area for plate-like nanoparticles such as, for example, nanographene or nanoclays) of greater than or equal to 10, specifically greater than or equal to 100, more specifically greater than or equal to 200, and still more specifically greater than or equal to 500. Similarly, the two-dimensional aspect ratio for such nanoparticles may be less than or equal to 10,000, specifically less than or equal to 5,000, and still more specifically less than or equal to 1,000.

Nanoparticles, where included, may displace a corresponding amount of derivatized diamond nanoparticles. Thus in an embodiment, where an additional nanoparticle is used, the nanoparticle may be present relative to the derivatized diamond nanoparticles in a ratio of 0:100 to 99:1, specifically 5:95 to 95:5, more specifically 10:90 to 90:10, and still more specifically 25:75 to 75:25, based on the weights of derivatized diamond nanoparticles to nanoparticle.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include, for example, $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes are carbon based, tubular fullerene structures having open or closed ends, which may be inorganic or made entirely or partially of carbon, and may include also components such as metals, metalloids, and also ceramics. Nanotubes, including carbon nanotubes, may be single walled nanotubes (SWNTs) or multi-walled nanotubes (MWNTs).

Nanographite is a cluster of plate-like sheets of graphite, in which a stacked structure of one or more layers of the graphite, which has a plate-like two dimensional structure of fused hexagonal rings with an extended delocalized π-electron system, layered and weakly bonded to one another through π-πstacking interaction. Graphene in general, and including nanographene, may be a single sheet or several sheets of graphite having nano-scale dimensions, such as an average particle size of (average largest dimension) of less than, e.g., 500 nanometers (nm), or in other embodiments may have an average largest dimension greater than 1 μm. Nanographene may be prepared by exfoliation of nanographite or by catalytic bond-breaking of a series of carbon-carbon bonds in a carbon nanotube to form a nanographene ribbon by an "unzipping" process, followed by derivatization of the nanographene to prepare, for example, nanographene oxide.

Diamondoids may include carbon cage molecules such as those based on adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polyadamantane molecules including between 2 and about 20 adamantane cages per molecule (e.g., diamantane, triamantane, tetramantane, pentamantane, hexamantane, heptamantane, and the like).

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays may be included in the polycrystalline diamond. Nanoclays may be hydrated or anhydrous silicate minerals with a layered structure and may include, for example, alumino-silicate clays such as kaolins including hallyosite, smectites including montmorillonite, illite, and the like. Nanoclays may be exfoliated to separate individual sheets, or may be non-exfoliated, and further, may be dehydrated or included as hydrated minerals. Other mineral fillers of similar structure may also be included such as, for example, talc, micas including muscovite, phlogopite, or phengite, or the like.

Inorganic nanoparticles may also be included in the composition. Exemplary inorganic nanoparticles may include a metal or metalloid carbide such as tungsten carbide, silicon carbide, boron carbide, or the like; a metal or metalloid nitride such as titanium nitride, boron nitride, silicon nitride, or the like; a metal carbonate, a metal bicarbonate, and/or a metal nanoparticle such as iron, cobalt, nickel, an alloy comprising at least one of these, or the like.

It will be understood that, where a nanoparticle is included, the nanoparticle may be any material that when combined with the derivatized diamond nanoparticles and diamond microparticles, does not significantly adversely affect the desired properties of the polycrystalline diamond. In an embodiment, inclusion of nanoparticles further enhances desired properties of the polycrystalline diamond, such as hardness, crack/fracture resistance, substrate bonding, or other such properties.

In an embodiment, a useful nanoparticle may include a single or multi-walled carbon nanotube, nanographene, a diamond nanoparticle, a boron nitride nanoparticle, a boron carbide nanoparticle, a silicon nitride nanoparticle, a silicon carbide nanoparticle, or a combination comprising at least one of the foregoing. In an exemplary embodiment, a useful nanoparticle is a boron nitride nanoparticle. In a specific embodiment, the boron nitride nanoparticle is a cubic boron nitride nanoparticle.

In other embodiments, nanoparticles may also be functionalized to form derivatized nanoparticles. For example, nanoparticles may be coated with a boride, a carbide, a nitride, a metal carbonate, a metal bicarbonate, a non-catalytic metal, or a combination comprising at least one of the foregoing.

In addition to the derivatized diamond nanoparticles and the diamond microparticles, microparticles not identical to the diamond microparticles may be included.

As used herein, the term "microparticle" means and includes any particle having an average particle size of about 1 μm or greater. In an embodiment, the average particle size of the microparticle about 1 μm to about 250 μm, specifically about 2 μm to about 200 μm, and more specifically about 1 μm to about 150 μm.

Microparticles, where included, may displace a corresponding amount of diamond microparticles. Thus in an embodiment, where an additional microparticle is used, the microparticle may be present relative to the diamond microparticles in a ratio of 0:100 to 99:1, specifically 5:95 to 95:5, more specifically 10:90 to 90:10, and still more specifically 25:75 to 75:25, based on the weights of diamond microparticles to microparticle.

Exemplary microparticles may include a micrographene, a boron nitride microparticle, a silicon nitride microparticle, a silicon carbide microparticle, or a combination comprising at least one of the foregoing.

In the method, the derivatized diamond nanoparticles, diamond microparticles, and metal solvent-catalyst, as well as any additional nano- and/or microparticles and other additives, are combined to form the polycrystalline diamond. Combining may further comprise mixing a nanoparticle not identical to the derivatized diamond nanoparticles, and a microparticle not identical to the diamond microparticles, with the other components. Specifically, to effect this, the components including the derivatized diamond nanoparticles and diamond microparticles are first mixed in a solvent to form a suspended mixture. The solvent may be any solvent suitable for forming a suspension of these components, and may include deionized water, aqueous solutions having a pH of 2 to 10, water miscible organic solvents such as alcohols including methanol, ethanol, isopropanol, n- and t-butanol, 2-methoxyethanol (methyl cellosolve), 2-ethoxyethanol (ethyl cellosolve), 1-methoxy-2-propanol, dimethylsulfoxide, N,N-dimethylformamide, N,N-dimethylacetamide, N-methylpyrrolidone, gamma-butyrolactone, acetone, cyclohexanone, and the like, or a combination comprising at least one of the foregoing.

A binder may also be included in the slurry, to bind the derivatized diamond nanoparticles and diamond microparticles to retain shape during further processing prior to sintering. Any suitable binder may be used provided the binder does not significantly adversely affect the desired properties of the polycrystalline diamond. Binders may comprise, for example, a metal material such as a cobalt containing material, a polymeric material such as a polyacrylate, or polyvinylbutyral, an organic material such as a cellulosic material, or the like. It will be understood that these binders are exemplary and are not limited to these.

In an embodiment, mixing comprises slurrying the derivatized diamond nanoparticles, diamond precursor, and metal solvent-catalyst to form a uniform suspension. Mixing may further comprise slurrying a nanoparticle not identical to the derivatized diamond nanoparticles, and a microparticle not identical to the diamond microparticles, with the other components. As used herein, "uniform" means that the composition of the slurry, analyzed at random locations in the mixing vessel, has less than 5% variation in solids content, specifically less than 2% variation in solids content, and more specifically less than 1% variation in solids content, as determined by drying a sample of the slurry. In an embodiment, the suspension has a total solids content (derivatized diamond nanoparticles, diamond microparticles, and any other additives), of 0.5 to 95 wt %, specifically 1 to 90 wt %, more specifically 10 to 80 wt %, and still more specifically 10 to 50 wt %, based on the total weight of the slurry.

This suspended mixture is then heated to remove the solvent under elevated temperature. Thermally treating to remove solvent can be carried out by subjecting the mixture to a temperature of from about 400 to about 800° C., specifically about 450 to about 750° C. The thermal treating may be carried out for at least about 30 minutes, more specifically at least about 60 minutes, prior to annealing. The thermal treatment may be carried out under vacuum or at ambient pressure.

The polycrystalline diamond is formed by processing the polycrystalline diamond precursors (derivatized diamond nanoparticles, diamond microparticles, optional nanoparticles and/or microparticles, and metal solvent-catalyst) under conditions of heating and pressure.

As disclosed herein, "processing" means sintering the components of the polycrystalline diamond with interparticle bond formation and phase transformation of non-diamond lattice interstitial regions. Such a process is referred to herein as a high temperature high pressure, (HTHP) process, in which interparticle bonds are formed between the derivatized diamond nanoparticles, diamond microparticles, and any added nano- or microparticles. Such bonds may be covalent, dispersive including van der Waals, or other bonds. Specifically, the interparticle bonds include covalent carbon-carbon bonds, and in particular $sp^3$ carbon-carbon single bonds as found in a diamond lattice, sufficient to provide the hardness and fracture resistance disclosed herein. In an HTHP process, it is believed that component phases of the derivatized diamond nanoparticles and/or diamond microparticles undergo a phase change to form a diamond lattice (tetrahedral carbon) structure, and in particular, any graphitic phase (such as, e.g., that of the carbon onion and/or any amorphous carbon phase present in the diamond nanoparticles or diamond microparticles) that may be present can, in principle, undergo such a phase change and structural transformation from a delocalized $sp^2$ hybridized system (a delocalized π-system) as found in the graphitic (i.e., non-diamond) phase(s), to an $sp^3$ hybridized diamond lattice.

In addition to the derivatized diamond nanoparticles and diamond microparticles, nucleation particles may be included in the particulate mixture. Nucleation particles may comprise any type of particle on which grains of the polycrystalline diamond will nucleate and grow during an HTHP process, and may include, for example, fullerenes, diamondoids, amorphous carbon nanoparticles, graphite nanoparticles, or a combination comprising at least one of the foregoing. Ions may also be implanted into fullerene molecules, and such ion-implanted fullerenes. For example, ions of metals such as, for example, cobalt, iron, or nickel may be implanted into fullerene molecules and included as nucleation particles.

In another embodiment, when forming a polycrystalline diamond, carbon (e.g., graphite or amorphous carbon) can also be included as a carbon source additive to form an interparticle diamond phase.

In an embodiment, heating to effect sintering is carried out at a temperature of greater than or equal to about 1,000° C., and specifically greater than or equal to about 1,200° C. In an embodiment, the temperature used may be from about 1,200° C. to about 1,700° C., specifically from about 1,300° C. to about 1,650° C. The pressure used in processing may be greater than or equal to about 5.0 gigapascals (GPa), specifically greater than or equal to about 6.0 GPa, and more specifically greater than or equal to about 6.5 GPa. Processing may be carried out for 1 second to 1 hour, specifically for 1 second to 10 minutes, and still more specifically for 1 second to 2 minutes.

Thus, in an embodiment, combining further comprises sintering by subjecting the mixture to a pressure greater than about 5.0 GPa and a temperature greater than about 1,000° C., for a time of about 1 second to about 1 hour.

The composition includes a metal solvent-catalyst. As disclosed herein, the metal solvent catalyst acts to catalyze the carbon-carbon bond formation reaction. The metal solvent-catalyst catalyzes the formation of diamond-to-diamond bonds between the diamond microparticles and the diamond nanoparticles and between individual diamond nanoparticles to form the polycrystalline diamond. In an embodiment, the metal solvent-catalyst is a suitable transition metal and may comprise Ni, Fe, Co, Cr, Ru, Os, Mn, V, alloys thereof, or a combination comprising at least one of the foregoing. In a specific embodiment, the metal solvent-catalyst is a Group VIIIA element (e.g., iron, cobalt, or nickel), an alloy thereof, or a combination comprising at least one of the foregoing. In an exemplary embodiment, the metal solvent-catalyst comprises Co, an alloy thereof, or a combination comprising at least one of the foregoing.

In additional embodiments, the catalyst material may further, or alternatively comprise a carbonate material such as, for example, a carbonate of one or more of Mg, Ca, Sr, and Ba. Carbonates may also be used to catalyze the formation of polycrystalline diamond. Exemplary carbonates include magnesium carbonate, calcium carbonate, strontium carbonate, barium carbonate, or a combination comprising at least one of the foregoing. A combination comprising at least one of the foregoing metals and carbonates may be used.

The polycrystalline diamond prepared by the method may include the metal solvent-catalyst in an amount of about 0.1% to about 30% by weight.

A polycrystalline diamond prepared by the method may be a superabrasive for use in an article such as a cutting tool, such as a drill bit for an earth-boring apparatus. As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits and other drilling bits and tools known in the art.

In an embodiment, a method of making a superabrasive article (e.g., a drill bit), comprising forming a superabrasive polycrystalline diamond compact in an HTHP process by combining a diamond nanoparticle derivatized to include functional groups, diamond microparticles, and a metal solvent-catalyst; combining the polycrystalline diamond with a support, wherein the diamond microparticles have an average particle size greater than that of the derivatized diamond nanoparticle, and removing the metal solvent-catalyst.

The polycrystalline diamond surface may be affixed to a substrate to form a polycrystalline diamond compact (PDC) that in turn is attached to a support such as a drill head. The substrate may be a ceramic material. Polycrystalline diamond integrated onto such a substrate may also be referred to as a diamond table. In an embodiment, polycrystalline diamond may be formed on a supporting substrate of cemented tungsten carbide or another suitable substrate material in a conventional HTHP process as described, for example, in U.S. Pat. No. 3,745,623, granted Jul. 17, 1973, and titled "Diamond Tools for Machining;" or may be formed as a free-standing polycrystalline diamond compact without a supporting substrate, formed in a similar conventional HTHP process as described, for example, in U.S. Pat. No. 5,127,923, granted Jul. 7, 1992, and titled "Cutting and Drilling Tools;" the disclosure of each of which patents is incorporated herein by reference in its entirety. In an embodiment, the metal solvent-catalyst may be supplied from the supporting substrate during an HTHP process used to form the polycrystalline diamond. For example, the substrate may include a cobalt-cemented tungsten carbide material. The cobalt of the cobalt-cemented tungsten carbide may serve as the metal solvent-catalyst during the HTHP process.

Figure 4:
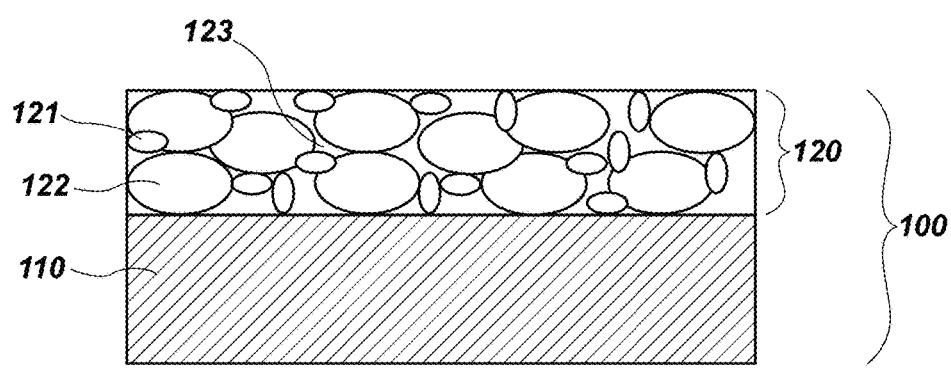
FIG. 4 is a simplified and schematically illustrated cross-sectional view of a polycrystalline diamond compact (PDC)

FIG. 4 illustrates an exemplary a polycrystalline diamond 120 incorporated into a polycrystalline diamond compact 100. In FIG. 4, a support 110, has a polycrystalline diamond 120 disposed on a surface of the support 110. The substrate support 110 may be formed of, for example, tungsten carbide or other suitable substrate material. Also, in an exemplary embodiment, the metal solvent-catalyst is cobalt or a cobalt alloy, where, during the sintering process, the metal solvent-catalyst intercalates into forming interstitial spaces 123 by wetting and capillary action, which exist throughout the polycrystalline diamond 120 between the previously derivatized diamond nanoparticles 121 and the diamond microparticles 122. It will be understood that during formation of the polycrystalline diamond 120 and/or during sintering of polycrystalline diamond 120, the functional groups present on the previously derivatized diamond nanoparticles 120 undergo thermal degradation under the high temperatures exceeding 900° C. used in the HTHP process, and sufficient to soften and/or melt the metal solvent-catalyst (e.g., where cobalt, which may be used as the metal solvent-catalyst is softened at a temperature of about 1,450° C.), and the previously derivatized diamond nanoparticles 121 and diamond microparticles 122 form interparticle bonds between the previously derivatized diamond nanoparticles, diamond microparticles, diamond nano- and microparticles, and any other nano- and/or microparticles or diamond-phases that may form during sintering. In a further embodiment, the metal solvent-catalyst may be wholly or partially removed from the polycrystalline diamond by, for example, a leaching process, to provide a PDC with reduced amounts of interstitial metal (i.e., from the metal solvent-catalyst).

In additional embodiments, amorphous carbon layers may be formed on particles of Ni, Pt, Cu, Fe, Co, Mo, Mg, Ag, Ti, Nb, Y, and Si to facilitate diamond nucleation and formation of the carbon-carbon interparticle bond. Alternatively, the amorphous carbon layers may be included on a material that does not readily form a carbide compound such as, for example, Cu or Au.

A method of forming a polycrystalline diamond comprises processing a suspension under heat and pressure and in the presence of a metal solvent-catalyst, the suspension comprising as components: diamond nanoparticles having an average particle size of 1 to 500 nm and derivatized to include functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing, diamond microparticles having a size greater than that of the derivatized diamond nanoparticles, and a solvent, wherein the components are more homogeneously distributed throughout the suspension than when a non-derivatized diamond nanoparticle is included in place of the derivatized diamond nanoparticle. The derivatized diamond nanoparticles and the diamond microparticles, and any added nanoparticles or microparticles, may remain homogeneously distributed after processing to form the polycrystalline diamond. Alternatively, the derivatized diamond nanoparticles and the diamond microparticles, and any added nanoparticles or microparticles, may adopt a gradient structure where the particle sizes of the constituent derivatized diamond nanoparticles and diamond microparticles, and any other particles therein, stratify to form zones in which the diamond microparticles distribute closer to the catalyst (table), and the diamond nanoparticles distribute to the surface, with intermediate, e.g., sub-micron sized, nanoparticles distributing to the middle of the polycrystalline diamond. Such a gradient structure for a polycrystalline diamond is described in U.S. Patent Application Publication 2012/0037431, published Feb. 12, 2012, and titled "Cutting Elements Including Nanoparticles in At Least One Portion Thereof, Earth-Boring Tools Including Such Cutting Elements, and Related Methods", the disclosure of which is incorporated herein in its entirety by this reference.

The metal solvent-catalyst catalyzes the formation of the interparticle bonds between the functionalized diamond nanoparticles and diamond microparticles during the HTHP process. During the HTHP process, the metal solvent-catalyst may intrude or intercalate into the interstitial spaces in the polycrystalline diamond as it is forming the interstitial lattice and carbon-carbon bonds, wicking upwards from the ceramic surface into the porous interstitial structure of the polycrystalline diamond as it forms. In this way, the resulting metallic intrusions may act to interconnect and adhere the underlying ceramic substrate to the polycrystalline diamond and bond the polycrystalline diamond to the ceramic substrate, thereby forming a thermally stable diamond table.

After the HTHP process, the metal solvent-catalyst (e.g., cobalt) remains in the interstitial spaces, which may be open or closed cell pores, between the inter-bonded particles. Some of the metal solvent-catalyst may become entrapped in closed-cell pores within the body of the polycrystalline diamond or PDC and some of the metal solvent-catalyst remains in the more open-cell pores of the polycrystalline diamond.

Such metal solvent-catalyst may be removed from the polycrystalline diamond after the HTHP process. A leaching process may be used to remove at least a portion of, or substantially all of, the metal solvent-catalyst from the interstitial spaces between the inter-bonded grains within the polycrystalline diamond. As used herein, "substantially all" means having a total amount of metal solvent-catalyst in the leached regions of the polycrystalline diamond of less than about 5 wt %, specifically less than or equal to 4 wt %, still more specifically less than or equal to 3 wt %, based on the weight of metal per unit volume of leached region of the polycrystalline diamond. In another embodiment, the polycrystalline diamond contains at least about 1.5 wt % weight of metal per unit volume of the polycrystalline diamond.

In one embodiment, the polycrystalline diamond may be leached using a leaching agent and process such as those described more fully in, for example, U.S. Pat. No. 5,127,923, previously incorporated by reference; and U.S. Pat. No. 4,224,380, granted Sep. 23, 1980, and titled "Temperature Resistant Abrasive Compact and Method for Making Same," the disclosure of which patent is incorporated herein by reference in its entirety.

For example, aqua regia, which is a mixture of concentrated nitric acid ($HNO_3$) and concentrated hydrochloric acid (HCl), in any effective proportion such as, for example, in a 1:3 (v/v) ratio, may be used to at least remove substantially all catalyst material from the interstitial spaces between the inter-bonded grains in the polycrystalline diamond. Alternatively, boiling hydrochloric acid (HCl) and/or boiling hydrofluoric acid (HF) may be used as leaching agents. In an exemplary embodiment, a useful leaching agent is hydrochloric acid (HCl) heated to a temperature of greater than 110° C., which may be provided in contact with the polycrystalline diamond for about 20 min to about 1,000 hours or even greater, depending upon the size of the body including the polycrystalline diamond, and the extent of leaching desired in the polycrystalline diamond.

Thus, in an embodiment, leaching comprises immersing the polycrystalline diamond compact in hydrochloric acid, hydrofluoric acid, nitric acid, or a combination comprising at least one of the foregoing, at a temperature at or greater than 20° C.

After leaching the metal solvent-catalyst from the polycrystalline diamond, the interstitial spaces between the inter-bonded grains within the polycrystalline diamond may be free of substantially all catalyst material used to catalyze formation of inter-particle bonds between the grains in the polycrystalline diamond.

The overall microstructure in the polycrystalline diamond that may be achieved in accordance with the method disclosed herein may result in polycrystalline diamonds and PDCs that exhibit improved durability and thermal stability.

The high surface area of nanoparticles may be available for surface modification and reactivity. Therefore, adhesion between functionalized or coated nanoparticles may be relatively stronger than adhesion between a similar mass of larger particles. Furthermore, nanoparticles may be blended with catalysts, such as Co, Pt, Pd, etc., and/or nucleation centers, such as fullerenes, to further increase mechanical properties. Diamond nanoparticles may have a metastable shell that converts to a diamond phase during HTHP processing, bonding coarse superabrasive diamond particles and promoting the removal of conventional catalysts (e.g., cobalt).

In addition to use in PDCs, particles disclosed herein may be used as coatings on other materials. Such coatings may have improved resistance to corrosion (e.g., from hydrogen sulfide or water vapor), increased permeation selectivity (e.g., preferential impediment for water over oils), or other properties. Coatings having particles as disclosed herein may be beneficial in oilfield applications, such as on packers, blow-out prevention elements, sucker rods, sensor protectors, O-rings, T-rings, gaskets, pump shaft seals, tube seals, electrical seals and insulators, etc. Barrier or diffusion properties, which may be related to surface wettability, may be selectively varied for use in filtration, such as by varying the size of particles and/or the composition of coatings. Coatings may have thicknesses of, for example, from about 0.1 µm (100 nm) to about 500 µm. Coatings may be formed, for example, by dispersing a liquid medium over or around a body. The liquid medium (e.g., water, another solvent, or any mixture thereof) may have nanoparticles dispersed therein. The nanoparticles may comprise, for example, from about 0.1 wt % to about 16 wt % of the liquid medium. The liquid medium may be dried, leaving a coating on the body.

Diamond nanoparticles may combine various properties. For example, diamond nanoparticles may be extremely hard, may be chemically inert, may have low electrical conductivity and high thermal conductivity, may have wide optical transparency, etc. Diamond nanoparticles may withstand high temperatures and pressures, and may be selected for use in applications requiring resistance to heat and pressure.

While one or more embodiments have been shown and described, modifications and substitutions may be made thereto without departing from the spirit and scope of the invention. Accordingly, it is to be understood that the present invention has been described by way of illustrations and not limitation. The above embodiments are further illustrated in the following examples.

EXAMPLES

A commercially available diamond nanoparticle cluster (75 mg, having an average particle size of about 75 nm, available from NanoDiamond Products) is suspended in 100 ml of liquid ammonia in a dry ice/acetone bath. Lithium metal (175 mg) is added to the liquid ammonia solution, whereupon the solution attains a blue color indicating dissolution of the lithium metal. When the addition of lithium is complete, the solution is stirred for 30 minutes, and 1-iodododecane (I—$CH_2$—$(CH_2)_{10}$—$CH_3$) (6.5 ml) is then added slowly to the ammonia slurry of metalized diamond nanoparticles. The resulting solution is allowed to react for four hours at room temperature, after which ammonia is slowly removed to isolate the solid product. The resulting solid material is isolated to yield 1-dodecyl-derivatized diamond nanoparticles.

Figure 5:
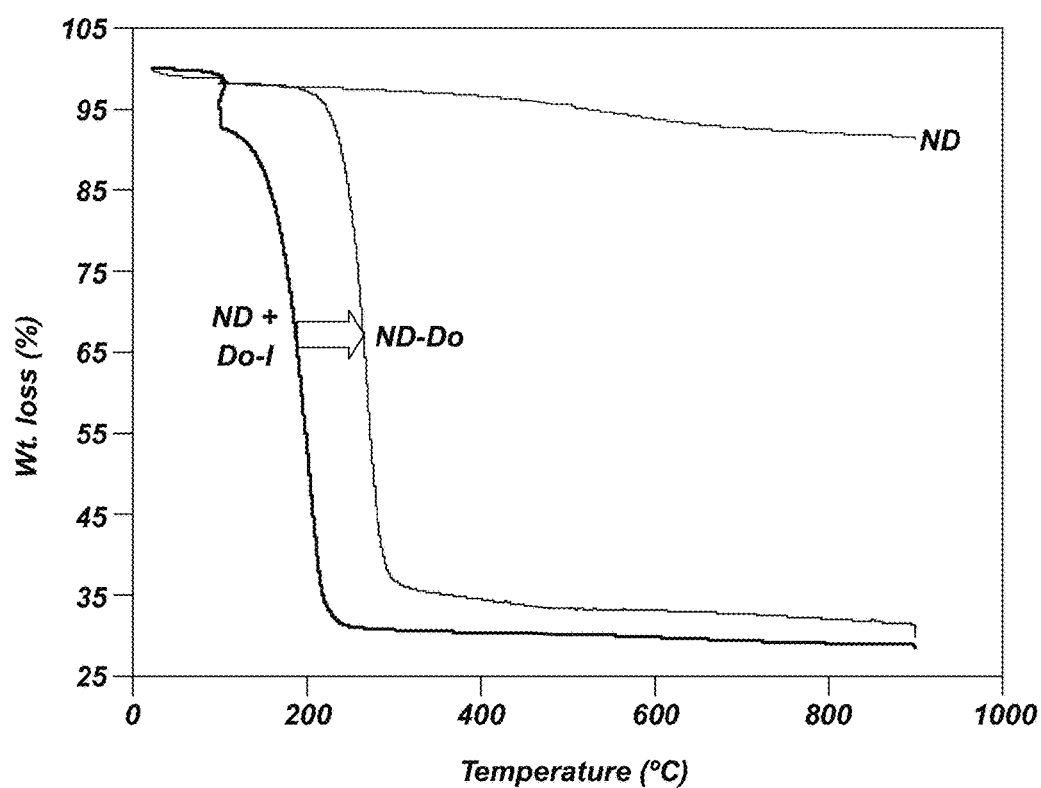
FIG. 5 is a comparative thermogravimetric analysis (TGA) plot showing TGA performance of diamond nanoparticles (ND), diamond nanoparticles in admixture with 1-iodododecane (ND+Do-I), and n-dodecyl modified diamond nanoparticles (ND-Do)

Thermogravimetric analysis (TGA). The functionalized diamond nanoparticles are evaluated by TGA to confirm the presence of covalently bound n-dodecyl groups. FIG. 5 shows a comparative thermogravimetric analysis (TGA) plot of weight loss versus temperature, showing TGA performance of diamond nanoparticles (ND), diamond nanoparticles in a mechanically mixed admixture with 1-iodododecane (ND+Do-I), and n-dodecyl-modified diamond nanoparticles (ND-Do). In FIG. 5, it can be seen that the diamond nanoparticle control (ND) does not exhibit significant change in weight with increasing temperature, where both the diamond nanoparticle-1-iodododecane admixture and the dodecyl-modified diamond nanoparticles each show a weight loss with increasing temperature. The TGA plot, obtained at a heating rate of 10° C./minute, shows a clear increase in degradation temperature from the admixture of ND+Do-I, with an onset temperature of about 100° C. and a maximum rate of change at about 190° C., to ND-Do, with an onset temperature of about 200° C. and a maximum rate of change at about 260° C. Thus, based on the comparison, it can be seen that the dodecyl groups are bound (e.g., covalently) to the diamond nanoparticles after derivatization.

Figure 6A:
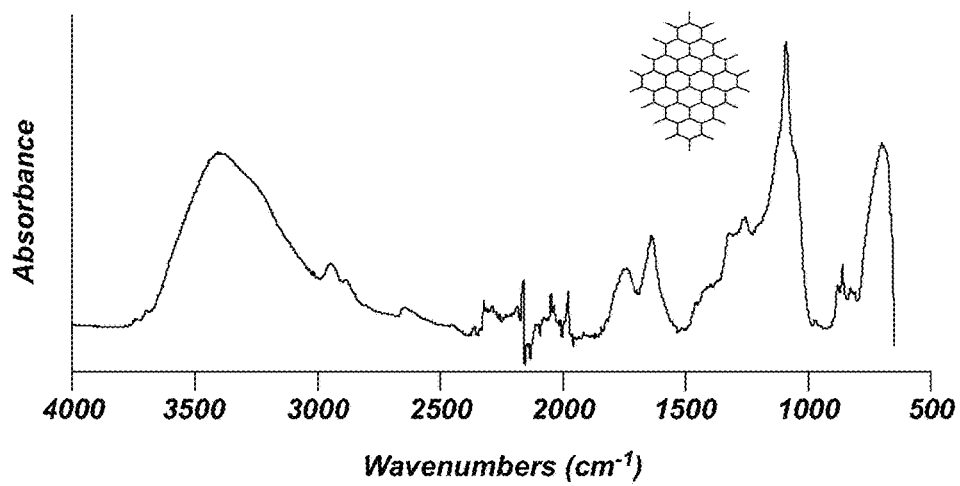
FIGS. 6A and 6B show Fourier Transform Infrared Spectrophotometry (FT-IR) spectra for unmodified diamond nanoparticles (FIG. 6A) and for n-dodecyl modified diamond nanoparticles (FIG. 6B)
Figure 6B:
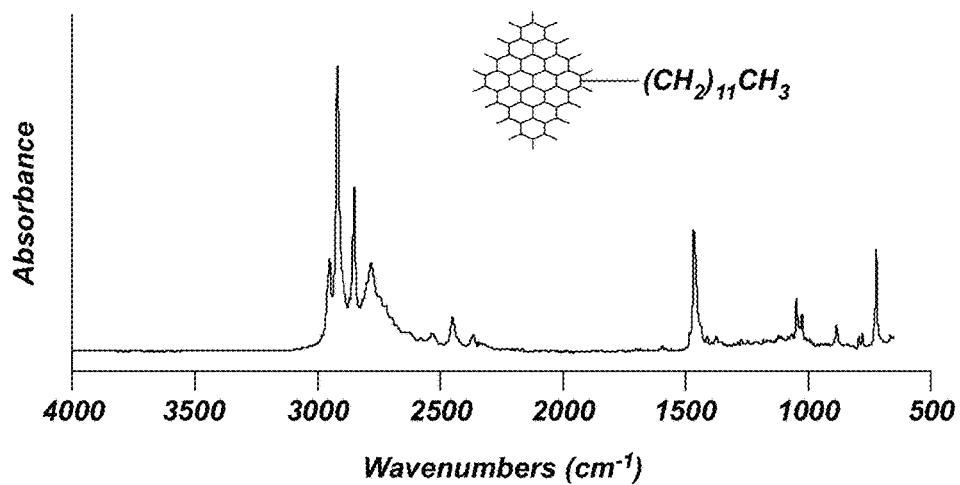

Infrared analysis (IR). A comparison of the infrared spectra using a Fourier Transform Infrared Spectrophotometer (FT-IR) is shown in FIGS. 6A and 6B for the unmodified diamond nanoparticles (FIG. 6A) and for the n-dodecyl modified diamond nanoparticles (FIG. 6B). In FIG. 6A, the diamond nanoparticles prior to derivatization has a complex spectrum including associated water O—H stretching at about 3300 $cm^{-1}$ and C—H olefinic stretching at >3000 $cm^{-1}$ as well as C—H alkyl stretching at <3000 $cm^{-1}$, carboxylic acid and anhydride carbonyl stretching at about 1700-1800 $cm^{-1}$, and C=C stretching at about 1600-1670 $cm^{-1}$, whereas after derivatization, the FT-IR spectrum shown for the dodecyl-modified diamond nanoparticles in FIG. 6B shows prominent and sharp new peaks at 2800-2980 $cm^{-1}$ and 725-1470 $cm^{-1}$, corresponding to alkyl C—H stretch and deformation modes, respectively. Thus it can be clearly seen in the FT-IR spectra that the diamond nanoparticles have been derivatized to include dodecyl groups.

Figure 7A:
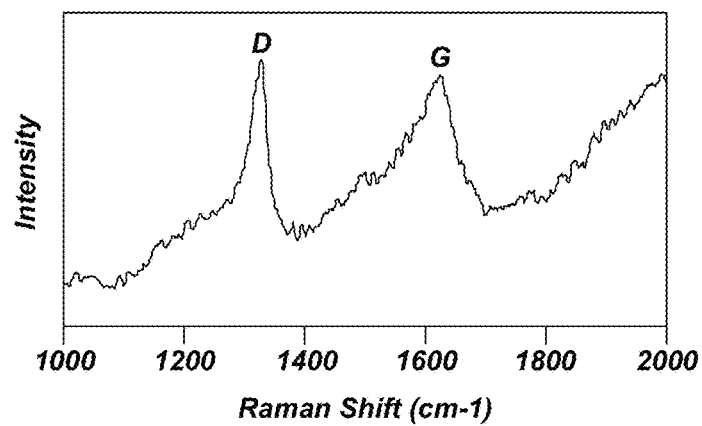
FIGS. 7A through 7C show Raman IR spectra of as-received diamond nanoparticles (FIG. 7A), diamond nanoparticles after being derivatized with dodecyl groups (FIG. 7B) and of post-TGA diamond nanoparticles (FIG. 7C)
Figure 7B:
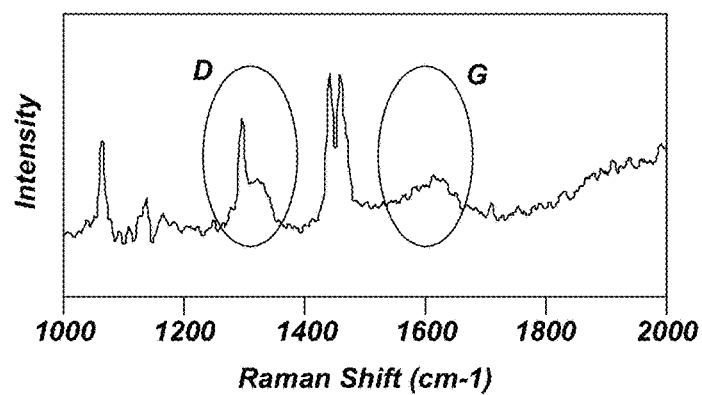
Figure 7C:
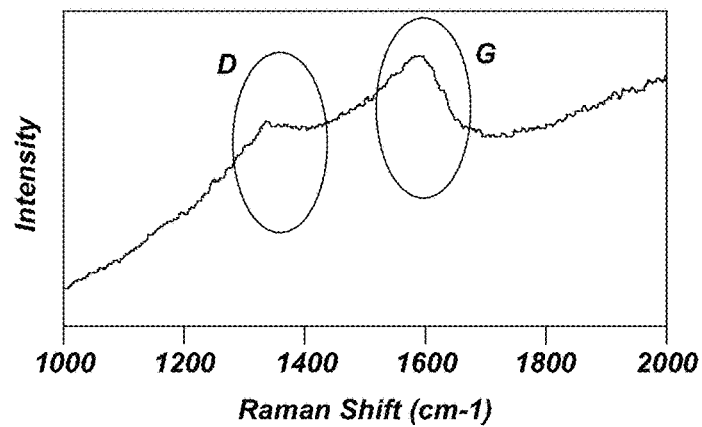

Reaction validation study by Raman Spectroscopy. FIGS. 7A through 7C show the Raman IR spectra of as received diamond nanoparticles (FIG. 7A), diamond nanoparticles after being derivatized with dodecyl groups (FIG. 7B) and of post-TGA diamond nanoparticles (FIG. 7C). FIG. 7A shows peaks at 1325 and 1623 $cm^{-1}$ corresponding to the D-band (disorder band) and G-band (graphitic band) of the diamond nanoparticles, respectively. Upon derivatization, and as expected, the intensity of the G-band (at 1294 $cm^{-1}$ in FIG. 7B) decreases significantly with respect to the intensity of the D-band (at 1610 $cm^{-1}$ in FIG. 7B). The additional bands between 1200-1600 $cm^{-1}$ correspond to the presence of the dodecyl group after derivatization of the diamond nanoparticles (see, e.g., Raman Spectrum of 1-Bromo-Dodecane, *J. Chem. Phys,* 1940, vol. 8, p. 867). However, upon heating at high temperature, the derivatized diamond nanoparticles lose the functional groups resulting in increase of the G-band intensity with respect to the D-band intensity (FIG. 7C). Thus inclusion of the functional groups is useful for improving solvent dispersibility but does not necessarily form a part of the polycrystalline diamond component after sintering.

Formation of a Polycrystalline Diamond Compact (PDC) using derivatized diamond nanoparticles.

A slurry of diamond nanoparticles having an average cluster size of 75 nm were derivatized by the aforementioned process and combined with a slurry of diamond microparticles having an average particle size of 4 micrometers. The diamond microparticles were stabilized in a solution by inclusion of a solvent, dispersant, and binder. The two separate solutions were mixed and subsequently dried to remove excess solvent. A derivatized diamond nanoparticle PDC is formed from the dried mixture of diamond microparticles in which the diamond microparticles constitute about 90 to 95 weight percent of the mixture (based on the combined weight of diamond nanoparticles and diamond microparticles), with the remainder of particles being the derivatized diamond nanoparticles. The solid mixture of diamond microparticles and derivatized diamond nanoparticles was placed onto a cobalt-cemented tungsten carbide substrate for forming the PDC. The mixture and substrate were then placed in a niobium can which was in turn placed in a standard high-pressure cell suitable for HTHP processes. The can with diamond particle mixture is sintered at a temperature of about 1,400 to 1,550° C. and at a pressure of about 4.2 to 6 GPa for about 90 seconds to form the derivatized nanoparticle enhanced PDC.

A comparative PDC was formed using only the diamond microparticle slurry as a base composition (where the diamond microparticles constituted 100 wt % of the solid mixture), and another comparative PDC was formed from a combination of a slurry of the diamond nanoparticles (underivatized) and the diamond microparticle slurry. Both comparative PDCs were prepared using identical processes.

Figure 8:
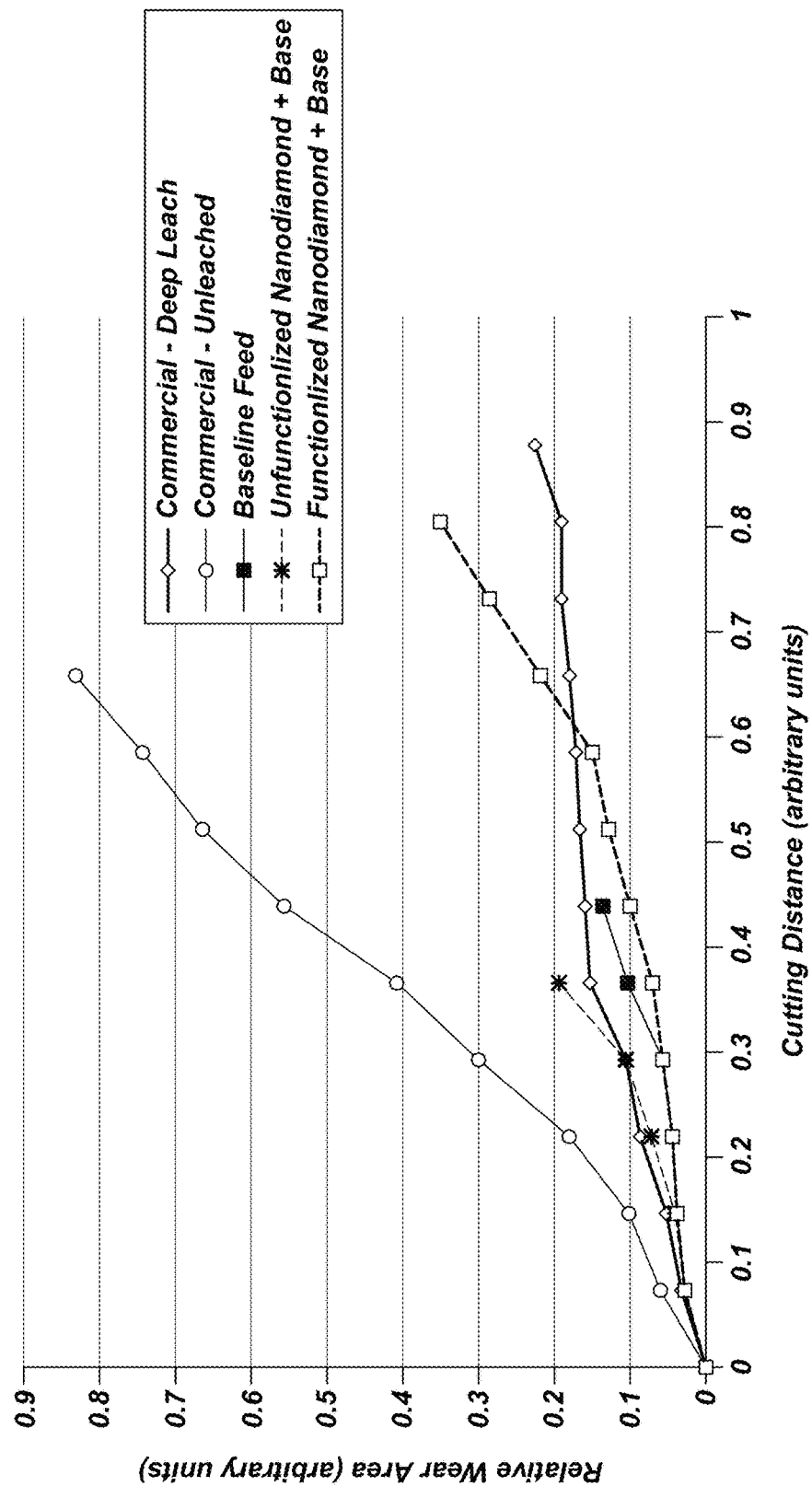
FIG. 8 is a comparative plot of relative wear area versus cutting distance for polycrystalline diamond materials prepared with derivatized diamond nanoparticles and diamond microparticles, and comparative polycrystalline diamond materials prepared with non-derivatized diamond nanoparticles and diamond microparticles, diamond microparticles only, a commercial polycrystalline diamond material, and a "leached" commercial polycrystalline diamond material.

FIG. 8 shows a comparative plot of relative wear area (arbitrary units) versus cutting distance (arbitrary units) for an unleached commercial PDC ("Commercial-Unleached"), a commercial PDC deep leached to remove catalyst ("Commercial-Deep Leach"), the baseline PDC prepared with only the diamond microparticles ("Baseline Feed"), the PDC prepared using unfunctionalized diamond nanoparticles plus diamond microparticles ("Unfunctionalized Nanodiamond+Base"), and the PDC prepared using the functionalized diamond nanoparticles plus diamond microparticles ("Functionalized Nanodiamond+Base"). As seen in the plot, the unfunctionalized diamond nanoparticle PDC deviates sharply from the functionalized diamond nanoparticle PDC, reaching a relative wear of about 0.2 in a cutting distance of about 0.37, where the functionalized diamond nanoparticle PDC does not incur the same degree of wear until reaching a cutting distance of about 0.64. The baseline PDC with only diamond microparticles shows an intermediate wear resistance between that of the unfunctionalized diamond nanoparticle PDC and the functionalized diamond nanoparticle PDC.

The unleached commercial PDC shows significant wear per cutting distance, reaching a relative wear of about 0.2 by a cutting distance of about 0.23 and showing almost linear wear up to 0.84 relative units out to a cutting distance of about 0.66. While the deep leached commercial PDC shows the least overall wear of about 0.23 out to a cutting distance of about 0.88, the functionalized diamond nanoparticle PDC showed the lowest initial wear with the lowest slope, at a total wear of about 0.7 to a cutting distance of about 0.36 (compare to the deep leached commercial PDC, which showed more than twice the wear at 0.16 in the same cutting distance). Further, the functionalized diamond nanoparticle PDC showed less wear than the deep leached commercial PDC out to a cutting distance of about 0.62.

From these results, it can be seen that the initial and abrasion resistance of a PDC prepared with derivatized diamond nanoparticles has significantly improved wear resistance performance over that of an exemplary commercial PDC, a PDC prepared using diamond microparticles alone, or a PDC prepared using underivatized diamond nanoparticles and diamond microparticles. Further, the initial wear resistance of the PDC prepared using derivatized diamond nanoparticles and diamond microparticles, and which was not deep leached, is still superior to that of a deep-leached commercial PDC.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the phase(s) includes at least one phase). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Additional non-limiting example embodiments of the disclosure are described below.

Embodiment 1

A substance, comprising diamond particles having a maximum linear dimension of less than about 1 μm, and an organic compound attached to surfaces of the diamond particles. The organic compound comprises at least one of a surfactant and a polymer Embodiment 2

The substance of Embodiment 1, wherein the organic compound comprises sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylenesorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, or a block copolymer based on ethylene oxide and propylene oxide.

Embodiment 3

The substance of Embodiment 1 or Embodiment 2, wherein the organic compound substantially covers outer surfaces of the diamond particles.

Embodiment 4

The substance of any of Embodiments 1 through 3, wherein the diamond particles comprise a non-diamond carbon-based outer shell.

Embodiment 5

The substance of any of Embodiments 1 through 4, wherein the diamond particles comprise agglomerates of diamond nanoparticles, the organic compound attached to surfaces of the agglomerates of diamond nanoparticles.

Embodiment 6

The substance of any of Embodiments 1 through 5, wherein the diamond particles comprise diamond nanoparticles.

Embodiment 7

The substance of any of Embodiments 1 through 6, wherein the diamond nanoparticles have an average maximum linear dimension of less than about 200 nm.

Embodiment 8

The substance of any of Embodiments 1 through 7, wherein a ratio of an average maximum linear dimension of the diamond particles to an average minimum linear dimension of the diamond particles is greater than about 100.

Embodiment 9

A method of forming a substance, comprising exposing diamond particles to an organic compound, the organic compound comprising at least one of a surfactant and a polymer, and exposing the diamond particles in the presence of the organic compound to ultrasonic energy. The diamond particles have a maximum linear dimension of less than about 1 μm.

Embodiment 10

The method of Embodiment 9, further comprising selecting the organic compound to comprise sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylenesorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, or a block copolymer based on ethylene oxide and propylene oxide.

Embodiment 11

The method of Embodiment 9 or Embodiment 10, further comprising tailoring a composition of the solution such that about 0.1 wt % to about 40 wt % of the solution is comprised by the organic compound.

Embodiment 12

The method of any of Embodiments 9 through 11, wherein exposing the diamond particles to the organic compound comprises exposing agglomerated diamond nanoparticles to the organic compound.

Embodiment 13

A composition, comprising a liquid, a plurality of diamond nanoparticles dispersed within the liquid, and an organic compound. The organic compound comprises at least one of a surfactant and a polymer attached to surfaces of the diamond nanoparticles.

Embodiment 14

The composition of Embodiment 13, wherein the organic compound is selected from the group consisting of sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylene-sorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, and a block copolymer based on ethylene oxide and propylene oxide.

Embodiment 15

The composition of Embodiment 13 or Embodiment 14, wherein the liquid comprises a solution including a solvent and the organic compound. The solvent is selected from the group consisting of water, an oil, an alcohol, a glycol, an acid, an aldehyde, a ketone, an amide, an amine, and combinations thereof.

Embodiment 16

The composition of Embodiment 15, wherein the solvent comprises a solvent selected from the group consisting of methylethylketone, methyletherketone, tetrahydrofuran, dimethylformamide, and sulfuric acid.

Embodiment 17

The composition of Embodiment 15 or Embodiment 16, wherein from about 0.1 wt % to about 40 wt % of the solution is comprised by the organic compound.

Embodiment 18

A method, comprising mixing a plurality of diamond particles with a solution comprising a liquid solvent and an organic compound, and exposing the mixture including the plurality of diamond nanoparticles and the solution to ultrasonic energy. The organic compound comprises at least one of a surfactant and a polymer.

Embodiment 19

The method of Embodiment 18, further comprising selecting the diamond particles to comprise diamond nanoparticles.

Embodiment 20

The method of claim 19, further comprising drying the mixture, and sintering the diamond nanoparticles in the presence of a catalyst at a pressure of at least about 5.0 GPa and a temperature of at least about 1,300° C. to form a polycrystalline diamond compact.

Embodiment 21

The method of any of Embodiments 18 through 20, further comprising selecting the organic compound to comprise sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylene-sorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, or a block copolymer based on ethylene oxide and propylene oxide.

While the present disclosure has been described herein with respect to certain embodiments, those of ordinary skill in the art will recognize and appreciate that it is not so limited. Rather, many additions, deletions and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventors. Further, embodiments of the disclosure have utility with different and various bit profiles as well as cutting element types and configurations.

The invention claimed is:

1. A substance, comprising:
    diamond particles comprising at least one functional group and having a maximum linear dimension of less than about 1 µm; and
    an organic compound attached to surfaces of the functionalized diamond particles, the organic compound comprising at least one of a surfactant and a polymer, wherein the organic compound is selected from the group consisting of sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylenesorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, and a block copolymer based on ethylene oxide and propylene oxide.

2. The substance of claim 1, wherein the organic compound substantially covers outer surfaces of the functionalized diamond particles.

3. The substance of claim 1, wherein the functionalized diamond particles comprise a non-diamond carbon-based outer shell.

4. The substance of claim 1, wherein the functionalized diamond particles comprise agglomerates of diamond nanoparticles, the organic compound attached to surfaces of the agglomerates of functionalized diamond nanoparticles.

5. The substance of claim 1, wherein the functionalized diamond nanoparticles have an average maximum linear dimension of less than about 200 nm.

6. The substance of claim 1, wherein a ratio of an average maximum linear dimension of the functionalized diamond particles to an average minimum linear dimension of the functionalized diamond particles is greater than about 100.

7. A composition, comprising:
 a liquid;
 a plurality of diamond nanoparticles comprising at least one functional group dispersed within the liquid; and
 an organic compound, the organic compound comprising at least one of a surfactant and a polymer attached to surfaces of the functionalized diamond nanoparticles, wherein the organic compound is selected from the group consisting of sodium laurel sulfate, 4-dodecylbenzenesulfonic acid, sodium dodecylbenzenesulfonate, sodium dodecylsulfonate, sodium alkyl allyl sulfosuccinate, polystyrene sulfonate, dodecyltrimethylammonium bromide, cetyltrimethylammonium bromide, polyoxyethylene (20) stearyl ether, polyethylene glycol 4400 octadecyl ether, sodium dodecyl sulfate, polyethylene glycol sorbitan monooleate, polyoxyethylenesorbitan trioleate, polyethylene glycol sorbitan monolaurate, 4-(1,1,3,3-tetramethylbutyl)phenyl-polyethylene glycol, polyethylene glycol tert-octylphenyl ether, poly(vinylpyrrolidone)-1300, a block copolymer based on ethylene oxide and 1,2-butylene oxide, and a block copolymer based on ethylene oxide and propylene oxide.

8. The composition of claim 7, wherein the liquid comprises a solution including a solvent and the organic compound, the solvent selected from the group consisting of water, an oil, an alcohol, a glycol, an acid, an aldehyde, a ketone, an amide, an amine, and combinations thereof.

9. The composition of claim 8, wherein the solvent comprises a solvent selected from the group consisting of methylethylketone, methyletherketone, tetrahydrofuran, dimethylformamide, and sulfuric acid.

10. The composition of claim 8, wherein from about 0.1 wt % to about 40 wt % of the solution is comprised by the organic compound.

11. The composition of claim 8, wherein the solvent comprises water.

12. The composition of claim 7, wherein the plurality of functionalized diamond nanoparticles and the liquid form a suspension.

13. The composition of claim 7, wherein the plurality of functionalized diamond nanoparticles and the liquid form a slurry.

14. The composition of claim 7, wherein the functionalized diamond nanoparticles of the plurality have an average maximum linear dimension of less than about 200 nm.

15. The composition of claim 7, wherein the functionalized diamond nanoparticles of the plurality comprise a plurality of agglomerates of functionalized diamond nanoparticles, the organic compound attached to surfaces of the agglomerates of functionalized diamond nanoparticles.

16. The substance of claim 4, wherein the agglomerates of functionalized diamond nanoparticles comprise functionalized diamond nanoparticles having a maximum linear dimension in a range extending from about 4 nm to about 6 nm.

17. The substance of claim 16, wherein the agglomerates have maximum linear dimensions in a range extending from about 10 nm to about 400 nm.

\* \* \* \* \*